Sept. 3, 1968  F. J. ZUIDERWEG ET AL  3,399,870
APPARATUS FOR CONTACTING GASES AND LIQUIDS
Filed June 21, 1965

INVENTORS:
F. J. ZUIDERWEG
W. H. MANGER
BY:
THEIR AGENT

United States Patent Office 3,399,870
Patented Sept. 3, 1968

3,399,870
APPARATUS FOR CONTACTING GASES
AND LIQUIDS
Frederik J. Zuiderweg, and Willem H. Manger, Amsterdam, Netherlands, assignors to Shell Oil Company, New York, N.Y., a corporation of Delaware
Filed June 21, 1965, Ser. No. 465,657
Claims priority, application Netherlands, June 25, 1964, 6407227
9 Claims. (Cl. 261—114)

ABSTRACT OF THE DISCLOSURE

Apparatus for effecting contact between a gas and a liquid wherein a gas stream is flowed within a column through a plurality of trays having tubular gas-liquid contacting units disposed therein. Liquid is supplied to one side of a first tray and flowed into the contacting units through openings therein where it comes into contact with gas flowing upwardly through the contacting unit. At least a portion of the contacted liquid is recirculated through the contacting unit and transferred to one side of each successive tray where it is flowed across each succeeding tray in the manner discussed hereinabove.

---

This invention relates to apparatus for contacting liquids and gases, which apparatus comprises a contacting chamber enclosed by a tubular wall through which the gas and liquid move concurrently in an upward or downward direction, the said chamber having gas and liquid inlets at one end and gas and liquid outlets at the other. Several contacting units of such construction can be combined to effect an over-all countercurrent flow between the liquid and gas. Thus, trays containing several contacting units may be spaced longitudinally inside a columnar structure for the distillation of hydrocarbons, etc.

The term "gas" is herein used generically to include vapor.

Contacting apparatus of the type mentioned above are already known, for example, from U.S. Patent 2,808,897 and from the copending Netherlands patent application 282,917. The purpose of such apparatus is to atomize the liquid in a gas stream so that the liquid and the gas come into close contact and subsequently to separate the liquid from the gas. The separation is obtained by imparting a rotary motion to the gas by means positioned in each unit, preferably near the upper end thereof. The rotary motion is transferred to the liquid particles such that they are subjected to a centrifugal force which drives them outwardly to the wall of the unit where they may be collected and subsequently discharged.

It is also known to arrange a number of the aforementioned contacting units in longitudinal series throughout a column to increase the efficiency of the separation. In such a situation, the gas and liquid initially enter the apparatus at opposite ends to effect an over-all countercurrent flow throughout the series of units. Furthermore, it is known from the aforementioned Netherlands application and likewise from the copending Netherlands patent applications 299,912, 299,913 and 300,388 to arrange a plurality of contacting units on each tray in order to increase the over-all capacity of the apparatus. However, in all the aforementioned prior art structures the liquid only comes into contact with the gas one time on each tray regardless of the number of units which are situated on such trays. This has proven particularly disadvantageous in those instances where only a relatively small amount of liquid comes into contact with the gas, as for example, in distillation at subatmospheric pressure. It has also been observed that single occurrence contact per tray is insufficient in processes of exchange where there is a high resistance to a component leaving the liquid.

Broadly, the present invention provides a system by which the contact between liquid and vapor can be increased and various other means which permit control of the extent to which this contact is increased.

According to one aspect of the invention the liquid separated by each tubular contacting unit on a given tray is returned to liquid which is present on that tray and is thereby available for supply to the same or other tubular contacting units located on the said tray.

As a result of recirculating the liquid through several contacting units on each tray, the surface area of the liquid which comes into contact with the gas is greatly increased thereby effecting a more intense mass exchange between the phases. Surprisingly, it has been found that the gain in efficiency of the separation is not accompanied by an increased load on the gas passing through the contacting apparatus.

According to the invention, the liquid may be passed through the same contacting unit a plurality of times or, alternatively, may be passed successively through a number of contacting units located on a given tray in a manner such that in each unit the liquid only comes into contact with the gas a single time.

In a specific embodiment of the invention the trays and each of a plurality of contacting units on the trays are constructed so that liquid is supplied to one side of each of the trays and caused to flow laterally across the trays to a liquid discharge means thereon. With such an arrangement, the liquid passes a single time through each of the contacting units on a given tray thereby effecting a pure cross-flow of liquid over the tray.

The invention will now be described with reference to the accompanying drawing wherein.

Figure 1:
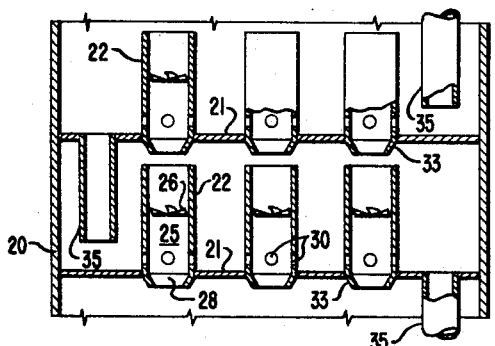
FIGURE 1 is a longitudinal section of part of a column built up of trays on which are placed a number of contacting units according to the invention.

Referring to FIGURE 1 there is shown a longitudinal section of a generally cylindrical column 20. Mounted at different levels throughout the height of the column 20 are a plurality of horizontal trays 21. Each of the trays 21 is provided with a plurality of gas-liquid contacting devices 22. The contacting devices 22 occupy corresponding positions on each of the trays 21 so as to be in vertical alignment with each other throughout the height of the column 20. This facilitates ease of gas flow upwardly through a plurality of such contacting units.

The contacting units 22 are preferably tubular in shape and define a contacting chamber 25 having located therein a vane deck 26. Gas enters the chamber 25 through the opening 28 and liquid enters the chamber 25 through the circular perforations 30 circumferentially spaced about the lower end of the contacting unit 22. Between the vane deck 26 and the opening 28 there may be provided means (not shown) for atomizing the liquid, for instance, another vane deck or obstacles on the inner wall of the tubular contacting unit 22. A radially inwardly protruding annular collar 33 is formed on the lower side of the tray 21 above each of the tubular contacting units 22. The lower end of the collars 33 are of slightly smaller diameter than the tubular contacting units 22 and permit gas to flow upwardly therethrough.

Liquid communication between the trays 21 is provided by means of the conduits 35 which are formed alternately on the left- and right-hand sides of vertically adjacent trays.

During operation, liquid enters the top of the column 20 through one of the conduits 35 and flows toward another conduit 35 located on the opposite side of the tray 21 to which it has been passed, as will be more fully described. After first coming into contact with a given tray 21 via one of the conduits 35, the liquid will pass into the chamber 25 of the first contacting unit 22 encountered. After passing into such a chamber 25 through openings 30 the liquid is carried along the inner side of the wall of the tubular contacting device 22 by a gas stream which ascends through the opening 28 from any source, such as the next lower unit. As the liquid encounters the gas, liquid droplets are formed via gas entrainment and any liquid coalescing on the inner wall 22 is re-entrained in the gas. Thus, a sweeping and dispersal action is created within the chamber 25 due to the gas velocity. As the gas flows through the vane deck 26 it is given a rotary motion about the vertical axis of the contacting chamber 25. This sets up centrifugal forces whereby the dispersed liquid droplets are flung outwardly to the inner wall 22 while being swept upward by the gas. The gas, largely denuded of liquid escapes through the opening formed by the lower end of the radially inwardly directed collar 33 while the liquid moves outwardly over the brim of the tubular contacting device 22 and then drops downward over the outside of the contacting device 22 to the tray 21.

In the arrangement shown in FIGURE 1, the liquid separated after passing through a given contacting unit 22 will partially re-enter that same contacting unit and partially flow downstream into the next laterally adjacent contacting unit 22. This effect is caused by the arrangement of the supply-discharge conduits 35 on opposite sides (left and right) of each vertically adjacent tray 21. Thus, there is an over-all cross-flow of liquid over any given tray 21. It is to be understood, that the degree of recirculation through each of the contacting units 22 on the trays 21 will be largely determined by the rate of liquid supply to a given tray through the conduits 35.

Figures 2, 3:
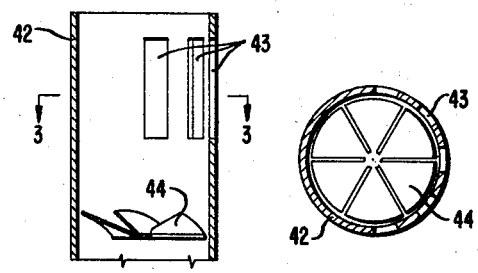
FIGURE 2 is a longitudinal section showing a modified embodiment of a tubular contacting unit.
FIGURE 3 is a cross-sectional view taken on the line 3—3 of FIGURE 2.

In FIGURE 2, one-half of the circumference of the upper wall of each contacting unit 42 has been provided with slot shaped openings 43. The liquid which is present above the vane deck 44 can escape through the openings 43 and flow down the outside of the device. By placing the slot shaped openings 43 on the sides of the tubular contacting units 42 which are located downstream, i.e., closer to a discharge conduit 35 for the tray liquid, a greater degree of control of the amount of liquid recirculated through any given contacting unit 43 is obtained. The openings 43 may take any desired shape, but the total surface area thereof is preferably selected to be large enough so that the maximum amount of liquid to be supplied to a contacting unit may be discharged therethrough.

Figures 4, 5:
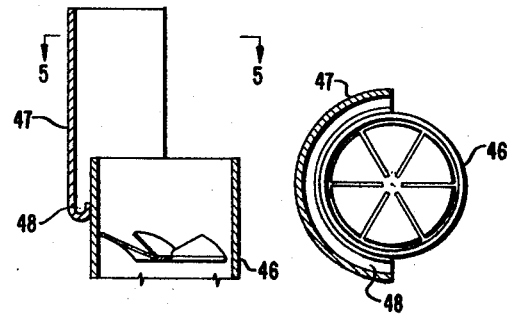
FIGURE 4 is a longitudinal section showing another modified embodiment of a tubular contacting unit.
FIGURE 5 is a cross-sectional view taken on the line 5—5 of FIGURE 4.

In FIGURE 4, a modified contacting unit 46 has been provided with a semi-cylindrical receiving device 47 which may protrude above the contacting unit 46. The lower end of the receiving device 47 is turned inwardly into contact with the outer wall of the contacting unit 46 to provide a drain 48.

As best shown in FIGURE 5, the liquid discharged on the side of the receiving device 47 is collected in the drain 48 and passed through this drain to the other side of the contacting device 46. Thus, as can be readily understood, liquid may flow all sidedly over the top of the contacting unit 46 and at least a part of that liquid which would flow off on the side located upstream, is collected in the receiving device 47 and by means of the drain 48 pass to the side located downstream.

Thus, the receiving device 47 and drain means 48 provide a suitable means for governing the direction of the liquid flow over the tray and serve to control the amount of recirculation of the liquid through any one of the given contacting units 46. Of course, it is to be understood that this governing effect may be obtained in varying degrees by installing the receiving device 47 over only a small part of the circumference of the unit 46, thereby providing the receiving device 47 with a drain means 48 which covers only a small portion of the circumference of the contacting unit 46. It is also possible to position the receiving device 47 in such a manner that it entirely encircles the contacting unit 46. Then, by providing the drain of the receiving device on the downstream side with an outlet conduit, the total liquid content may be passed onto the next contacting unit 46.

Figures 6, 7:
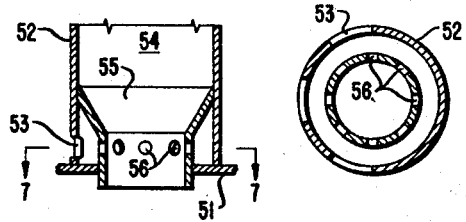
FIGURE 6 is a longitudinal section showing yet another modified embodiment of a tubular contacting unit.
FIGURE 7 is a cross-sectional view taken on the line 7—7 of FIGURE 6.

FIGURES 6 and 7 illustrate another modification of the invention for governing the direction of liquid flow across a tray 51 to thereby control the amount of recirculation through each individual contacting unit, such as shown at 52. As shown, the lower end of the wall of the contacting apparatus 52 is provided with liquid supply openings 53 on one side only, i.e., the upstream side. However, in order to effect better distribution of the liquid entering the chamber 54, a distributor device 55 is positioned within the contacting unit 52. The distributor element 55 is provided at evenly spaced locations about its circumference with openings 56 through which the liquid entering the chamber 54 may be more evenly distributed to the gas stream flowing upwardly through the unit.

Figures 8, 9:
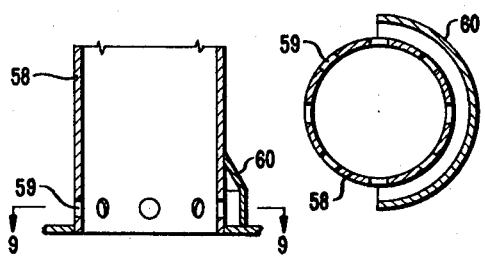
FIGURE 8 is a longitudinal section showing a still further modified embodiment of a tubular contacting unit.
FIGURE 9 is a cross-sectional view taken on the line 9—9 of FIGURE 8.

FIGURES 8 and 9 illustrate a modified form of apparatus for achieving the same results as that obtained with the apparatus depicted in FIGURES 6 and 7. As shown, the base of the contacting unit 58 is provided with evenly spaced liquid inlet openings 59 about its circumference. However, a portion of the inlet openings 59 located on the downstream side of the contacting unit 58 are bounded by a hooded element 60 thus preventing recirculation of liquid discharged on the downstream side to the unit through which it has just passed. An advantage of this embodiment is that a distributor element such as that shown at 55 in FIGURE 6, forms no restriction for the upwardly flowing gas stream, thereby decreasing the amount of gas flow resistance.

Figure 10:
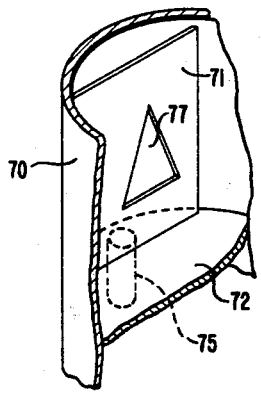
FIGURE 10 is a partial isometric showing a modified embodiment of a tray discharge outlet.

FIGURE 10 shows a portion of a column 70, which is similar to the column 20 shown in FIGURE 1. A plate member 71 extends vertically between trays contained in the column such as are shown at 72. A conduit 75 is provided in the floor of the tray 72 in a manner similar to the conduits shown at 35 in FIGURE 1. The plate 71 forms a partition between the discharge conduit 75 of a given tray 72 and that portion of the tray which is provided with contacting units such as are shown, for example, in any one of the preceeding FIGURES 1–9. An opening 77 is provided in the plate 71 at a given vertical distance from the top of the tray 72. Thus, by means of the plate 71 provided with an opening or a plurality of openings 77 the liquid level on the tray 72 may be controlled.

The plate members 71 provided with the opening(s) 77 are advantageous in carrying out the separation process of the invention in that they permit control of the liquid level on any of the given trays 72 in such a manner that within each tubular contacting unit positioned on the trays the ratio between gas flow and liquid flow may be maintained substantially constant. Without the use of such plate members 71 it is possible that the amount of liquid supplied to each of the contacting units will, in some instances, tend to diminish and consequently the liquid/gas ratio will decrease. Such a decrease in the liquid/gas ratio should of course be avoided since it results in a decrease of the efficiency of the separation process.

As will be understood, the number area, size, shape and position of the openings 77 formed in the plate 71 control the level of the liquid under the various load conditions and must be determined for each individual case in view of the resistance to flow of the liquid to the contacting units and the degree in which it is desired to recirculate liquid to these contacting units.

We claim as our invention:

1. Apparatus for effecting contact of gas and liquid comprising:
   (a) a hollow, vertical cylindrical column;
   (b) a plurality of horizontal trays mounted at vertically spaced locations within said column; each of said trays having at least one opening therein for receiving a contacting unit;
   (c) a tubular walled contacting unit secured in each of said openings defining a contacting chamber;
   (d) means for admitting a stream of gas to the lower end of said column for upward flow through each contacting chamber on the said trays;
   (e) liquid supply means cooperating with the upper surface of said trays for supplying liquid to one side of each of said trays;
   (f) liquid inlet means formed in the lower portion of the tubular walls of each of said contacting units and above the upper surface of each of said trays thereby cooperating with the upper surface of said trays for supplying said liquid to the contacting chambers for entrainment by said gas stream;
   (g) vane means mounted in said chamber intermediate the upper and lower ends thereof for imparting rotary motion about the longitudinal axis of said chamber to said stream;
   (h) outlet means for gas and liquid at the other end of said chamber and in communication with the upper surface of said trays; and,
   (i) liquid discharge means cooperating with liquid deposited on the upper surface of said trays for discharging said liquid from the side of each of said trays opposite said one side having said liquid supply means.

2. Apparatus as set forth in claim 1 wherein each of said contacting units is provided with means for controlling the extent to which liquid being supplied to a given tray may be recirculated through each of said individual contacting units secured thereto.

3. Apparatus as set forth in claim 2 wherein said means for controlling the extent of liquid recirculation to each contacting unit comprises a plurality of openings formed in the wall of each of said units above the vane means thereof and on the side of said units which is closest to said tray liquid discharge means.

4. Apparatus as set forth in claim 2 wherein said means for controlling the extent of liquid recirculation to each contacting unit comprises a semi-cylindrical receiving device cooperating with said outlet means and having its lowermost end turned inwardly into contact with the outer wall of said contacting units so as to form a drain having outlets on the side of said contacting units which is closest to said tray liquid discharge means.

5. Apparatus as set forth in claim 2 wherein said means for controlling the extent of liquid recirculation to each contacting unit comprises said contacting unit liquid inlet means being arranged only on the side of said units nearest said tray liquid supply means.

6. Apparatus as set forth in claim 2 wherein said means for controlling the extent of liquid recirculation to each contacting unit comprises hooded means disposed on the lower end of said contacting units for preventing liquid communication between the contacting chamber and liquid which has been expelled from said unit on the side thereof nearest said tray liquid discharge means.

7. Apparatus as set forth in claim 2 wherein liquid level control means are provided on each of said trays for controlling the height of the liquid level on the said trays.

8. Apparatus as set forth in claim 7 wherein said liquid control means comprises a vertically extending perforated plate member positioned on said tray between said contacting units and said liquid discharge means.

9. Apparatus as in claim 8 wherein the area defined by said perforations of said plate member decreases with the height above the tray.

References Cited
UNITED STATES PATENTS

| | | | |
|---|---|---|---|
| 1,741,519 | 12/1929 | Huff | 261—114 |
| 1,983,762 | 12/1934 | Kotzebue | 261—114 |
| 2,006,986 | 7/1935 | De Florez | 261—114 |
| 2,665,975 | 1/1954 | Ng | 23—270.5 |
| 2,804,935 | 9/1957 | Hutchinson | 261—114 X |
| 2,808,897 | 10/1957 | Reinsch et al. | 55—238 |
| 3,233,389 | 2/1966 | Dahlen | 261—114 X |
| 3,295,841 | 1/1967 | Hutchinson | 261—114 |

HARRY B. THORNTON, *Primary Examiner.*

TIM R. MILES, *Assistant Examiner.*